Dec. 29, 1936.   A. KALTENBACH ET AL   2,066,204
GUIDE PULLEY BEARING FOR BAND DRIVE IN DENTAL MACHINES
Filed Jan. 10, 1935
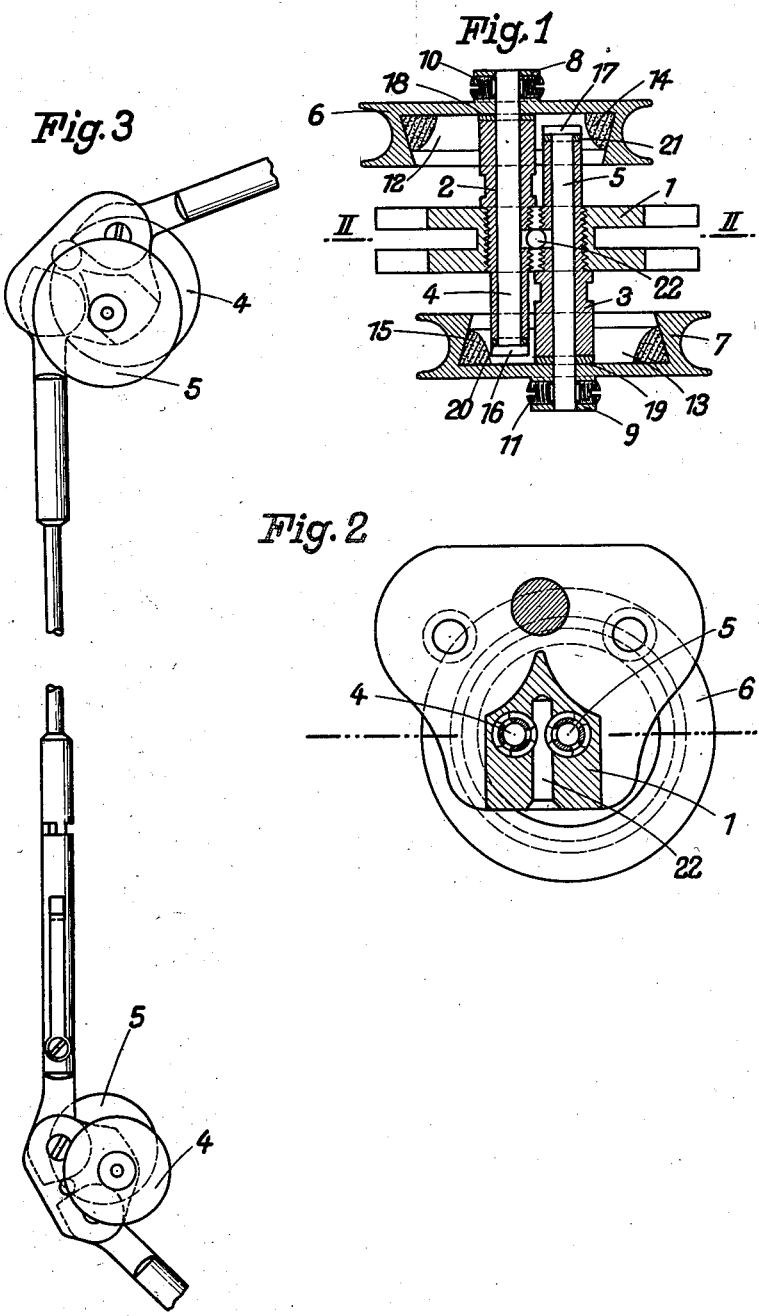
Inventor:
Alois Kaltenbach
& Richard Voigt,
By Watson, Coit, Morse & Grindle
ATTYS.

Patented Dec. 29, 1936

2,066,204

UNITED STATES PATENT OFFICE 2,066,204

GUIDE-PULLEY BEARING FOR BAND DRIVE IN DENTAL MACHINES

Alois Kaltenbach and Richard Voigt, Potsdam, Germany

Application January 10, 1935, Serial No. 1,246
In Germany June 8, 1934

5 Claims. (Cl. 74—240)

The invention relates to a guide-pulley bearing for band drive in dental machines.

Hitherto guide pulleys have been mounted with short hubs by means of thin bearing bushes on axles fastened in the link. The short bearings do not give the desired easy running and they wear away quickly in consequence of the heavy and unavoidable lateral loading by the driving band even in the case of the employment of hardened steel and hardened and ground axles. The noises thus produced are highly undesirable particularly in the case of dental machines. The known bearing has further the disadvantage that the lubricating oil is liable to reach the edges of the pulleys unless special precautions are taken to prevent the spraying of the oil.

These disadvantages are obviated according to the invention by the feature that the guide pulleys fastened on the axles are mounted in bearing bushes arranged in the link. In this way it is possible to make the bearing bushes of the proper length for securing a satisfactory running of the guide pulleys.

The easy running of the guide pulleys may be improved in the case of this bearing by the now possible use of very thin axles, because the lubrication of the bearings need not now, as hitherto, be effected through holes in the axles, but lubrication is possible from the outside through the bearing bushes.

It is particularly advantageous to arrange the axles of the guide pulleys in separate bearings arranged side by side and to carry the bearing bushes through the link. In this way there is obtained a particularly long bearing, which secures a satisfactory quiet running of the guide pulleys.

In order to avoid the lateral pressure loading on the thin axles, it is further proposed that the bearing bushes extend as far as possible into the guide pulleys which are hollowed out towards the link. A further improvement is obtained by the feature that the bearing bushes extend through the link into the cavity of the guide pulley mounted in the adjacent bearing bush. In this way a broader construction of the bearings is possible and also the lubricant possibly issuing from the free bearing ends may be caught in the advantageously undercut recesses of the guide pulleys, which moreover may be lined with oil-absorbing material.

The new guide pulley bearing is represented by way of example in the drawing.

Figure 1 shows in cross-section the bearing of two guide pulleys of a link;

Figure 2 is a section corresponding to line II—II of Figure 1;

Figure 3 shows in side view the per se known arrangement of two such links in an arm.

In the constructional form according to Figures 1 and 2 the bearing bushes 2, 3 are fastened in the link 1. The bearing bushes contain the axles 4, 5 on the one end of which are fastened the guide pulleys 6, 7. The guide pulleys 6, 7 are provided on the side turned away from the link 1 with short hubs 8, 9 in which are inserted grub screws 10, 11 for fastening the guide pulleys 6, 7 on the axles 4, 5. The guide pulleys 6, 7 are provided on the side turned towards the link 1 with an undercut boring 12, 13, which is as deep as possible and which renders it possible to insert the bearings 2, 3 as deeply as possible into the interior of the guide pulleys 6, 7 and to catch the oil issuing at the bearing ends. The catching of the issuing oil may be further ensured by inserted rings 14, 15 of oil-absorbing material. As may be seen from Figure 1 the free ends of the bearings and axles also extend into the recesses 12, 13 of the adjacently mounted guide pulleys in such a manner that the lubricant possibly issuing here is also caught. The free bearing ends are provided with a flange 16, 17, whereby an easy axial fixing of the axles 4, 5 is made possible. At the ends of the bearings 2, 3 fibre rings 18, 19, 20, 21 are provided to improve the quiet running.

The lubrication of the bearing bushes 2, 3 is effected through the hole 22 which is provided in the link 1 and which extends through the walls of the adjacently arranged bearing bushes 2, 3.

We claim:—

1. A guide device for the driving band of a dental machine, which comprises a link member of the machine frame, bearing bushes fastened therein, axles mounted in said bearing bushes, and pulleys mounted on said axles and provided with undercut recesses containing oil absorbent material on the side nearer the link member, said bushes extending through the link member into the recess in the pulley whose axle is supported in the adjacent bearing bush.

2. In a dental machine including articulated arms forming a mechanical connection between a motor and a hand-piece, and an endless driving band coextensive with said arms and connecting a pulley on the hand-piece to a pulley on the motor, the combination with a link member connecting the several arms, adjacent pivots each securing said link to one of said arms, bearing bushes fastened in different parallel axes in said link, said axes being parallel to said pivot axes and each bush extending in opposite directions from the sides of the link, a guide pulley axle journalled in each bush and extending the full length thereof and a pulley secured on each axle, said pulleys being on opposite sides of said link member to guide the two reaches of the driving band.

3. In a dental machine including articulated arms forming a mechanical connection between a motor and a hand-piece, and an endless driving band coextensive with said arms and connecting a pulley on the hand-piece to a pulley on the motor, the combination with a link member connecting the several arms, adjacent pivots each securing said link to one of said arms, bearing bushes fastened in different parallel axes and extending through and from each side of the said link member, a guide pulley axle journalled in each bush and extending completely therethrough and a pulley secured on each axle, said pulleys being on opposite sides of said link member to guide the two reaches of the driving band and each having a cavity on the side nearer the link member, each bearing bush having both of its ends extending into the pulley cavities.

4. A guide device for the driving band of a dental machine comprising a link member of the dental machine frame, two bearing bushes fastened therein in different parallel axes and each extending beyond both sides of the said link member, a guide pulley axle journalled in each bush and extending completely therethrough, a pulley secured on each of said pulley axles one on each side of the said link member, the pulleys having under-cut cavities on the side nearer the said link member, and the bushes having both ends extending into the said cavities whereby oil from both ends of each bush is collected in said cavities.

5. A guide device for the driving band of a dental machine comprising a link member of the dental machine frame, two bearing bushes fastened therein in different parallel axes and each extending beyond both sides of the said link member, a guide pulley axle journalled in each bush and extending completely therethrough, a pulley secured on each of said pulley axles one on each side of the said link member, the pulleys having undercut cavities on the side nearer the said link member, and the bushes having both ends extending into the said cavities whereby oil from both ends of each bush is collected in said cavities and oil absorbing material in said cavities.

ALOIS KALTENBACH.
RICHARD VOIGT.